United States Patent
Rempe et al.

(10) Patent No.: US 12,503,232 B2
(45) Date of Patent: Dec. 23, 2025

(54) METHOD FOR DRAINING A LOCAL WATER DISTRIBUTION SYSTEM

(71) Applicant: Airbus Operations GmbH, Hamburg (DE)

(72) Inventors: Michael Rempe, Hamburg (DE); Frank Schneider, Hamburg (DE); Tim Lübbert, Hamburg (DE); Frederik Albers, Hamburg (DE); Hannes Müller, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 246 days.

(21) Appl. No.: 18/318,297

(22) Filed: May 16, 2023

(65) Prior Publication Data
US 2023/0382532 A1 Nov. 30, 2023

(30) Foreign Application Priority Data
May 25, 2022 (EP) .................................... 22175544

(51) Int. Cl.
*B64D 11/04* (2006.01)
*B64D 11/02* (2006.01)

(52) U.S. Cl.
CPC .............. *B64D 11/02* (2013.01); *B64D 11/04* (2013.01)

(58) Field of Classification Search
CPC ................................ B64D 11/02; B64D 11/04
See application file for complete search history.

(56) References Cited

U.S. PATENT DOCUMENTS

| 8,720,463 B2* | 5/2014 | Becker | B64D 11/02 4/596 |
| 10,822,774 B2* | 11/2020 | Lübbert | B64D 11/02 |
| 2009/0020172 A1 | 1/2009 | Walker | |

(Continued)

FOREIGN PATENT DOCUMENTS

| CN | 103498494 | 1/2014 |
| CN | 109291864 A | 2/2019 |
| DE | 102014109997 A1 | 2/2016 |

(Continued)

OTHER PUBLICATIONS

European Search Report for Application No. 22175544 dated Oct. 18, 2022.

(Continued)

*Primary Examiner* — Kevin F Murphy
(74) *Attorney, Agent, or Firm* — KDW Firm PLLC (57) ABSTRACT

A method for draining a local water distribution system including a buffer, supply lines connecting one or more consumers to the buffer and consumer valves associated with the one or more consumers. The buffer is configured for locally storing water from an aircraft water supply system to be distributed to the one or more consumers. Water from the buffer can be dispensed through a consumer of the one or more consumers by opening the consumer valve associated with the respective consumer. Water is drained from the supply lines by opening the consumer valves. Water is drained from the buffer through one of the supply lines and the consumer valves or through a drain valve connecting the buffer to a wastewater system of an aircraft. A corresponding local water distribution system and an aircraft are disclosed.

18 Claims, 3 Drawing Sheets

(56) References Cited

U.S. PATENT DOCUMENTS

2021/0355660 A1* 11/2021 Belkadhi .................. E03B 7/10
2022/0064039 A1* 3/2022 Nakama .................. E03D 9/02

FOREIGN PATENT DOCUMENTS

| EP | 3385163 A1 | 10/2018 |
| EP | 3771640 A1 | 2/2021 |
| WO | 2011056763 A1 | 5/2011 |

OTHER PUBLICATIONS

Extended European Search Report for EP Application No. 22175543. 2, dated Nov. 14, 2022, 5 pages.

* cited by examiner

METHOD FOR DRAINING A LOCAL WATER DISTRIBUTION SYSTEM

TECHNICAL FIELD

The disclosure herein is directed to a method for draining a local water distribution system onboard an aircraft. The disclosure herein is further directed to a local water distribution system and an aircraft comprising a local water distribution system.

BACKGROUND

When an aircraft is not used, water has to be removed from the water supply system, for example, for hygienic reasons but also to avoid bursting pipes and conduits caused by freezing water. In order to drain water from the pipes, one or more draining valves are provided in the aircraft fuselage. In conventional water supply systems, the pipes are installed with a slope towards the drain valves. For removing the water from the pipework, the drain valves and consumer valves associated with the consumers supplied by the water supply system are opened and water contained in the pipework is drained by gravity.

EP 3 385 163 A1 discloses an aircraft with a high-pressure water supply system. The supply system comprises a water storage tank, a supply pump and a plurality of consumers. A conduit system supplies water from the water storage tank to the consumers. Between the supply pump and the consumers, the conduit system comprises no rigid pipes but only flexible conduits having a maximum internal diameter of 8 mm or less. As compared to existing rigid plumbing, the flexible conduits are significantly easier to install due to their flexibility and small dimensions. Also, the weight of the flexible conduits is lower than the weight of conventional rigid tubes.

Given the limited amount of water that can be supplied at any time through the narrow supply lines, water supply systems using flexible conduits with a diameter of 8 mm or less may require the use of buffers at or in the vicinity of the consumers. The consumers are connected to the buffer using supply lines so that each buffer can locally supply one or more consumers with water. The buffers in combination with the supply lines and consumer valves form local water distribution systems. Examples of buffers which can be used in local water distribution systems are disclosed in European application nos. 21181889.3 and 22161620.4.

While the flexible conduits in the water supply system do not necessarily have to be drained to avoid damage by freezing water, it may, for example, be necessary to remove the water from the supply system and thus also from the local water distribution system for hygienic reasons when the aircraft is not used.

SUMMARY

It is, thus, an object of the disclosure herein to provide a method for draining a local water distribution system, a corresponding local water distribution system and an aircraft comprising such a local water distribution system.

The object underlying the disclosure herein is solved by the subject matter disclosed herein. Preferred embodiments are described herein.

In a first aspect the problem underlying the disclosure herein is solved by a method for draining a local water distribution system comprising a buffer, supply lines connecting one or more consumers to the buffer and consumer valves associated with the one or more consumers. The buffer is configured for locally storing water from an aircraft water supply system to be distributed to the one or more consumers and water from the buffer can be dispensed through a consumer of the one or more consumers by opening the consumer valve associated with the respective consumer. Water is drained from the supply lines by opening the consumer valves. Further, water is drained from the buffer through one of the supply lines and the consumer valves or through a drain valve connecting the buffer to a wastewater system of an aircraft.

In other words, a method is provided for removing water from a local water distribution system which distributes water provided by a water supply system to one or more consumers. The local water distribution system comprises a buffer which is provided for storing water supplied by a central aircraft water supply system. For example, the aircraft water supply system may comprise a central water tank from which water is supplied through a conduit system to the buffers. The aircraft water supply system may further comprise a supply pump which removes water from the central water tank and transports the water to the buffers or, in other embodiments, directly to consumers. The conduit system may comprise flexible conduits with a diameter of 8 mm or less. However, in other embodiments the conduit system could also be a conventional conduit system with conduits made from rigid or stiff pipes.

The buffer of the local water distribution system stores water from the central aircraft water supply system before it is supplied to one or more consumers associated with the buffer. For example, one buffer may provide for one or more consumers in an aircraft lavatory such as a tap or faucet in a sink, a flushing device for a toilet and a shower. Another buffer may provide water for one or more consumers in an aircraft galley such as a tap in a sink, a beverage maker, waste disposal unit and a steam oven. In particular, a buffer may provide water for all consumers in a lavatory or a galley or even for consumers arranged in multiple adjacent lavatories. It is also possible that one buffer and, thus, one local water distribution system is provided for distributing water to consumers in a galley and consumers in one or more adjacent lavatories. A buffer in a lavatory may, for example, provide sufficient amounts of water to operate the flush of the toilet multiple times and also operate the tap multiple times. Since the buffer can also be filled while no consumer is withdrawing water from the buffer, the average flow rate from the central water tank to the buffer can be lower than the maximum flow rate provided by the buffer to the consumers.

Each of the consumers is associated with a consumer valve and each consumer valve is associated with one consumer only. When the consumer valve is opened, water from the buffer is dispensed through the respective consumer. For example, when the consumer valve associated with a tap is opened, water may flow out of the tap and into the sink. For flushing a toilet, the supply valve associated with the flushing device is opened. A consumer valve associated with a consumer may be part of or comprised in the consumer, but it could also be separate from the respective consumer. Operation of the consumer is preferably controlled through a digital control which instructs the consumer valve to open and to close. The control may, for example, be provided for controlling a single consumer valve or more than one consumer valve can be controlled by the same control. For example, opening and closing of all consumers valves associated with consumers that are supplied with water by the same local water distribution system may be controlled by the same control.

The consumers are connected to the buffer using supply lines. The supply lines may be flexible tubes but could also be formed at least partly from conventional rigid pipes. In an example embodiment, the consumer valves are arranged in the supply lines between the buffer and the consumers. Each consumer which receives water from the same buffer may be connected to the buffer using individual supply lines, i.e., there is one single supply line for each consumer. However, it is also possible that the supply lines branch of from one or more main supply lines so that, for example, there is only one main supply line directly connected to the buffer and the remaining supply lines branch off from the main supply line.

In order to remove water from the supply lines and drain them, the consumer valves are opened which allows the water to flow out of the supply lines which are open. As will be explained in further detailed with regard to the preferred embodiment, water may be drained either towards the consumers in which case the water flows through the consumer valves and out of the consumers or the water may be drained into the buffer or towards the central water distribution system in which case the consumer valves are opened for venting the supply lines.

Furthermore, the buffer is drained either through the supply lines by allowing the water to flow either out of the buffer through one or more of the supply lines and an open consumer valve or the water is drained from the buffer through a specific drain valve in the buffer into a wastewater system of the aircraft. Preferred embodiments detailing how water is drained from the buffer are described below.

In a preferred embodiment, the supply lines connect a plurality of consumers to the buffer. The consumer valves are opened sequentially so that water is only drained from supply lines connecting the consumer associated with an open consumer valve to the buffer. In other words, not all consumer valves are opened at the same time but at least one consumer valve remains shut while at least one other consumer valve is open. For example, in an example embodiment a local water distribution system is provided for distributing water to a sink and shower head. In case the buffer is arranged vertically between the shower head and the tap of the sink, the consumer valve associated with the shower head may be opened first for venting the corresponding supply line so that water flows back from the supply lines connecting the shower head into the buffer. Once the consumer valve associated with the buffer has been closed, the consumer valve associated with the tap is opened so that water can be drained out of the buffer and the corresponding supply lines through the tap into the sink.

Preferably, the consumer valves are opened in a predetermined sequence. As described above, first the consumer valve associated with the shower head is opened before the consumer valve associated with the sink is opened to ensure that all water is drained from the buffers. In another embodiment in which a negative pressure is applied to draw water back into the buffer from the supply lines, it would also be preferable to first open the consumer valve associated with the shower head before the consumer valve associated with the tap is opened. Otherwise, due to gravity water from the shower head could flow back into the supply lines connecting the buffer to the tap which would thus have to be drained twice.

Further preferably, the sequence in which the consumer valves are opened is determined based on the length of the supply lines connecting the consumer associated with the consumer valves to the buffer and/or the sequence in which the consumer valves are opened is determined based on the relative vertical arrangement of the consumer valves. For example, when multiple supply lines are drained using a positive pressure generated, for example, by a pump or a pressure source arranged in or adjacent to the buffer, it would be advantageous to first open the consumer valves which are in terms of the length of the supply lines closest to the buffer and then continue with opening those which are further away. Thereby, it is ensured that no water can be pushed into supply lines which have already been drained. Alternatively, in case the supply lines are drained using a negative pressure, it those consumer valves which are furthest away in terms of length of the supply valves are opened first and the remaining consumer valves are opened in descending order by length of the supply lines. Again, this ensure that no water can be pushed by the pressure into supply lines which have already been drained. Further, in case the supply lines are drained using gravity, those supply lines connecting consumers to the buffer which are arranged vertically above other consumers are drained first to avoid water flowing back into already drained supply lines.

It is further preferred that only one consumer valve is opened at a time. This advantageously allows minimizing the pressure that is positive or negative pressure that may be required to drain the supply lines.

Further, each consumer valve is preferably opened for a predetermined time. The predetermined time is advantageously chosen such that the supply lines which are drained when the corresponding consumer valve is open are completely drained before the consumer valve is closed again. In case a buffer is drained while the corresponding consumer valve is opened, the predetermined time needs to account for the time the water takes to be drained from the buffer.

In a preferred embodiment, water is drained from the buffer and/or the supply lines by gravity. In case where a consumer valve associated with a consumer is located vertically below the buffer, it may be possible to drain the supply line at least partially or even entirely by gravity. Furthermore, in case the buffer has a dedicated drain valve or one of the consumer valves is located vertically below the buffer, it may also be possible to drain the buffer at least partially or even entirely by gravity. Draining the supply lines and/or the buffer at least partially by gravity advantageously reduces the amount of power that is required for draining the supply lines.

Preferably a consumer valve associated with a consumer of the one or more consumers having an outlet arranged vertically below the buffer is opened for draining water from the supply lines connecting the respective consumer to the buffer through the outlet arranged vertically below the buffer. In other words, the water from the buffer is drained through the outlet of the consumer associated with the consumer valve is which is located below the buffer. For example, a tap for a sink or a rinsing device for a toilet may be located below the buffer and the associated consumer valves can be opened by a control for draining the buffer.

Additionally or alternatively, a consumer valve associated with a consumer of the one or more consumers having an outlet arranged vertically above the buffer is preferably opened for draining water from the supply lines connecting the respective consumer to the buffer into the buffer. As previously discussed, in an example embodiment where the buffer is located below a consumer or the associated consumer valve, water from the supply lines connecting the buffer to the supply lines may be drained into the buffer. From the buffer this is afterwards drained, for example, using another consumer or a drain valve. All supply lines draining into the buffer should be drained before the buffer is drained completely to avoid having to drain the buffer multiple times unless the buffer was completely filled before the initial draining of the buffer began in which case it may be necessary to drain the buffer at least partially to make room for water from the supply lines draining into the buffer.

Additionally or alternatively, a consumer valve associated with a consumer of the one or more consumers having an outlet arranged vertically below the buffer is preferably opened for draining water from the buffer through the outlet arranged vertically below the buffer. In other words, the buffer is drained through a consumer valve and the supply lines connecting the consumer valve to the buffer.

In a preferred embodiment, the supply lines are subjected to a drainage pressure for draining water from the supply lines. Hence, in the preferred embodiment the supply lines are at least not completely drained by gravity or not all drained by gravity. Instead, the supply lines and preferably also the buffer are subjected to a negative or a positive draining pressure for removing water from the buffer. Using a draining pressure advantageously enables a faster draining of the supply lines. Further, supply lines which cannot be drained by gravity due to, for example, their small dimensions or their layout can be successfully drained using a positive or negative pressure. In some embodiments, a negative or a positive pressure may also be used in combination with gravity to accelerate drainage or facilitate complete drainage of the buffer.

Preferably, the draining pressure is provided by one of a pump arranged in the buffer for supplying water from the buffer to the consumers, a pressurizer keeping the water in the buffer during regular operation of the buffer at a predetermined consumer pressure or by the aircraft water supply system from which the buffer receives water to be supplied to the consumers. Negative draining pressure could, for example, also be generated using a compressor or a pressure vessel.

In other words, different pressure source may be used to create the draining pressure. For example, the buffer itself may comprise pump or micropump which is used during regular operation for feeding water from the buffer to the consumers. Provided that the pump also dry running capabilities, it could also be used to remove water from the buffer through supply lines and pressure the supply lines with air from the buffer so that all water is removed from the supply lines. Alternatively, the operation of the pump could also be reversed to pull water back into the buffer from where it may, for example, be drained through a drain valve or a consumer valve located below the buffer. Also in this case the pump needs to have excellent dry running capabilities to create a negative pressure, i.e., suction or vacuum, in the supply lines. A buffer with a micropump is disclosed in European application no. 21181889.3. In order to pressurize the buffer, it may be necessary to temporarily close any venting valves of the buffer.

Alternatively, a permanently pressurized buffer may also be used to drain the supply lines. Such a buffer requires a pressurization source which may either be used to create a positive draining pressure in the supply lines or by creating a negative pressure in the buffer by which water from the supply lines is sucked back into the buffer. A corresponding buffer is disclosed in European application no. 22161620.4.

Further alternatively, the draining pressure may be supplied by the aircraft water supply system which provides the water to be distributed by the local water distribution system. For example, when the central aircraft water supply system is drained using a positive pressure, by opening a supply valve through which usually water is supplied to the buffer, the positive pressure from the aircraft water supply system may be used as a positive pressure for draining the supply lines of the local water distribution system. Similarly, in case a negative pressure is used to drain the aircraft water supply system, by opening the supply valve of the buffer, the negative pressure from the aircraft water supply system can also be used to remove water from the supply lines and/or the buffer of the local water distribution system.

In a preferred embodiment a positive draining pressure is created in the supply lines such that when the consumer valve associated with a consumer of the one or more consumers is open, water is pushed out of the supply lines through the consumers associated with the open consumer valve. Additionally or alternatively, a positive draining pressure is preferably created in the buffer such that when the consumer valve associated with a consumer of the one or more consumers is open, water is pushed out of the buffer through the consumer associated with the open consumer valve. In order to create a positive draining pressure in the supply lines and/or the buffer, it may be necessary to close the supply valve through which water is received from the aircraft water supply system and/or any venting valves in the buffer.

In another preferred embodiment, a negative draining pressure is created in the supply lines such that water from the supply lines connecting a consumer associated with an open supply valve to the buffer is drained into the buffer or the aircraft water supply system. Additionally or alternatively, a negative draining pressure is created in the buffer such that when a consumer valve associated with a consumer of the one or more consumers or a vent of the buffer is open, water is drained into the aircraft water supply system.

In a second aspect, the disclosure herein is directed to a local water distribution system comprising a buffer, supply lines connecting one or more consumers to the buffer, consumer valves associated with the one or more consumers, and a control. The buffer is configured for locally storing water from an aircraft water supply system to be distributed to the one or more consumers. Water from the buffer can be dispensed through a consumer of the one or more consumers by opening the consumer valve associated with the respective consumer. The control is configured for opening the consumer valves for draining water from the supply lines. The control is further configured for opening a consumer valve for draining water from the buffer through one of the supply lines and the open consumer valve or configured for opening a drain valve for draining water in the buffer to a wastewater system of an aircraft.

In a preferred embodiment, the supply lines connect a plurality of consumers to the buffer and the control is configured for opening the consumer valves sequentially so that water is only drained from supply lines connecting the consumer associated with the open consumer valve to the buffer, wherein the control is preferably configured for opening the consumer valves in a predetermined sequence, wherein the sequence in which the consumer valves are opened is determined based on the length of the supply lines connecting the consumer associated with the consumer valves to the buffer and/or wherein the control is preferably configured for opening only one consumer valve at a time and/or wherein the control is preferably configured for opening each consumer valve for a predetermined time.

Preferably, the system is configured for draining from the buffer and/or the supply lines by gravity, wherein the control is preferably configured for opening a consumer valve associated with a consumer of the one or more consumers having an outlet arranged vertically below the buffer for draining water from the supply lines connecting the respective consumer to the buffer through the outlet arranged vertically below the buffer, and/or wherein the control is preferably configured for opening a consumer valve associated with a consumer of the one or more consumers having an outlet arranged vertically above the buffer for draining water from the supply lines connecting the respective consumer to the buffer into the buffer and/or wherein the control is preferably configured for opening a consumer valve associated with a consumer of the one or more consumers having an outlet arranged vertically below the buffer is opened for draining water from the buffer through the outlet arranged vertically below the buffer.

Furthermore, for draining water from the supply lines, the system is further preferably configured for subjecting the supply lines to a drainage pressure for draining water from the supply lines, wherein the system is preferably configured for providing the draining pressure by one of a pump arranged in the buffer for supplying water from the buffer to the consumers, a pressurizer keeping the water in the buffer during regular operation of the buffer at a predetermined consumer pressure or by the aircraft water supply system from which the buffer receives water to be supplied to the consumers.

In a preferred embodiment, the system is configured for creating a positive draining pressure in the supply lines such that when the consumer valve associated with a consumer of the one or more consumers is open, water is pushed out of the supply lines through the consumers associated with the open consumer valve, and/or the system is configured for creating a positive draining pressure in the buffer such that when the consumer valve associated with a consumer of the one or more consumers is open, water is pushed out of the buffer through the consumer associated with the open consumer valve.

Preferably, the system is configured for creating a negative draining pressure in the supply lines such that water from the supply lines connecting a consumer associated with an open supply valve to the buffer is drained into the buffer or the aircraft water supply system, and/or the system is configured for creating a negative draining pressure in the buffer such that when a consumer valve associated with a consumer of the one or more consumers or a vent of the buffer is open, water is drained into the aircraft water supply system.

The example configurations and embodiments described with regard to the method for draining a local water distribution system and their advantages also apply the corresponding embodiments of a local water distribution system.

In a third aspect the problem underlying the disclosure herein is solved by an aircraft according comprising a local water distribution system according to any of the preceding embodiments. The advantages of the aircraft correspond to the advantages of the local water distribution system comprised in the aircraft.

BRIEF DESCRIPTION OF DRAWINGS

In the following, the disclosure herein will be described further with regard to the example embodiments shown in the drawings, wherein.

DETAILED DESCRIPTION

Figure 1:
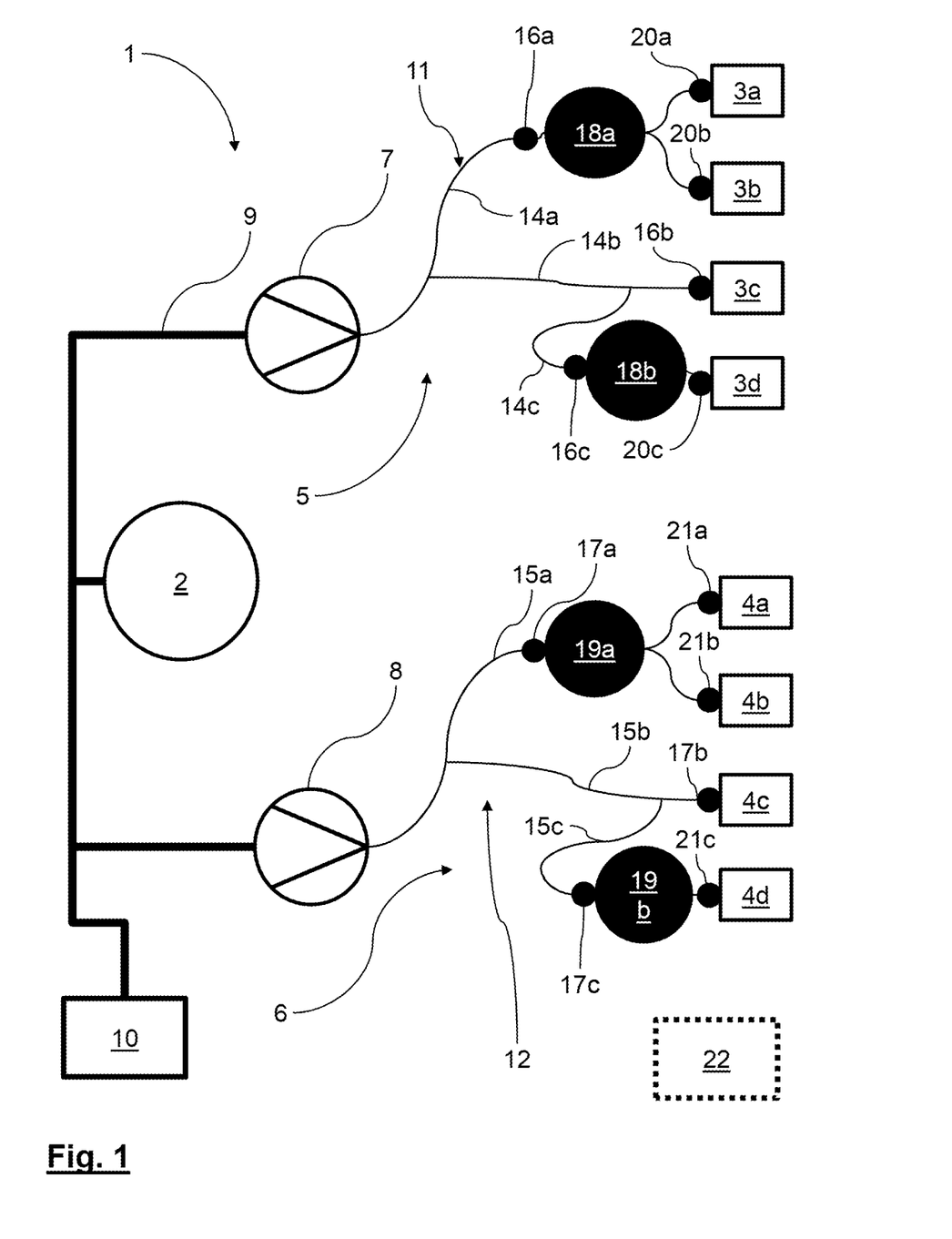
FIG. 1 shows a schematic drawing of an embodiment of a water supply system for an aircraft.

FIG. 1 shows an embodiment of a water supply system 1 for an aircraft. The supply system 1 comprises a central water tank 2 for supplying consumers 3*a*, 3*b*, 3*c*, 3*d*, 4*a*, 4*b*, 4*c*, 4*d* with fresh water. The consumers 3*a*, 3*b*, 3*c*, 3*d*, are also collectively denoted by reference numeral 3, the consumers 4*a*, 4*b*, 4*c* and 4*d* are also collectively denoted by reference numeral 4. Consumers 3*a*, 4*a* are faucets 3*a*, 4*a* of sinks in lavatories of an aircraft, consumers 3*b*, 4*b* are flushing or rinsing devices 3*b*, 4*b* for toilets arranged in the same lavatories as the faucets 3*a*, 4*a*, consumers 3*c* and 4*c* are steam ovens 3*c*, 4*c* located in an aircraft galley and consumers 3*d*, 4*d* are faucets 3*d*, 4*d* of sinks arranged in the aircraft galley.

The consumers 3, 4 are attached via two separate branches 5, 6 of the supply system 1 to the central water tank 2. Each branch 5, 6 comprises a supply pump 7, 8 providing water from the central water tank 2 to the consumers 3, 4. The supply pumps 7, 8 are connected to the central water tank 2 via conventional rigid low-pressure plumping or pipes 9. The pipes 9 have been installed with a slope towards a drain valve 10 which provides a connection to the environment of the aircraft and can be used to drain the central water tank 2 and the low-pressure plumping 9 solely using gravity. Not shown in the figures is a ventilation for the central water tank 2 which is required during gravity-based draining.

The consumers 3, 4 are supplied with water pumped by the supply pumps 7, 8 through respective conduit systems 11, 12. Each branch 5, 6 comprises an independent conduit system 11, 12 which is drained independently.

The conduit systems 11, 12 comprise flexible supply lines 14*a*, 14*b*, 14*c* and 15*a*, 15*b*, 15*c* collectively indicated with reference numerals 14 and 15, respectively. The supply lines 14, 15 are made from a plastic material and have an internal diameter of 4 mm. Each supply line terminates at a supply valve 16*a*, 16*b*, 16*c*, 17*a*, 17*b*, 17*c* associated with one or more consumers 3, 4. The supply valves 16*a*, 16*b*, 16*c* and 17*a*, 17*b*, 17*c* are collectively indicated with reference numerals 16 and 17, respectively. Supply valves 16*a* and 17*a* are associated with consumers 3*a*, 3*b* and 4*a*, 4*b*, respectively. Due to the small internal diameter of the supply lines 14, 15, the supply pumps 7, 8 have to pressurize the water in the supply lines to pressures to about 10 to 15 bar (1000 to 1500 kPa) to supply sufficient amounts of water to the consumers 3, 4.

A plurality of the consumers 3*a*, 3*b*, 3*d*, 4*a*, 4*b*, 4*d* is further associated with local buffers 18*a*, 18*b*, 19*a*, 19*b* which locally stored water provided through the conduit systems 11, 12. Water is dispensed from the buffers 18*a*, 18*b*, 19*a*, 19*b* by opening consumers valves 20*a*, 20*b*, 20*c*, 21*a*, 21*b*, 21*c* arranged directly at the respective consumers 3*a*, 3*b*, 3*d*, 4*a*, 4*b*, 4*d*. The consumers valves 20*a*, 20*b*, 21*a*, 21*b*, 21*c* are collectively referred to using reference numerals 20 and 21, respectively. For example, for drawing water from the faucet 4*d*, the corresponding consumer valve 21*c* is opened. Similarly, when the flushing 3*b* is operated by a person using the toilet in the lavatory, the corresponding supply valve 20b is opened. Different types of buffers 18a, 18b, 19a, 19b may be used. For examples, buffers 18a, 18b in the first branch 5 may be pressurized diaphragm buffers, whereas buffers 19a, 19b in the second branch 6 are unpressurized which include a micropump (not shown) for providing water to the associated consumers 4a, 4b, 4d.

Each consumer 3, 4 is further associated with a pressure reducer (not shown) which reduces the pressures of the water from the supply pressure used in the supply lines 14, 15 to a consumer pressure. While the supply pressure may, for example, be between 10 bar to 15 bar (1000 to 1500 kPa), the consumer pressure may, for example, be about 2.5 bar (250 kPa). The pressure reducer may be formed by the buffers 18, 19 or may be integrated in the supply valves 16, 17 or the consumer valves 20, 21.

Finally, the water supply system 1 comprises a control 22. In the example embodiment the control 22 is integrated into the aircraft's cabin control system. The control 22 controls amongst others operation of the supply pumps 7, 8 as well as the opening and closing of all supply valves 16, 17, all consumer valves 20, 21 and the drain valve 10. Control lines between the control 22 and the controlled units or devices have been omitted to keep FIG. 1 intelligible.

Figure 2:
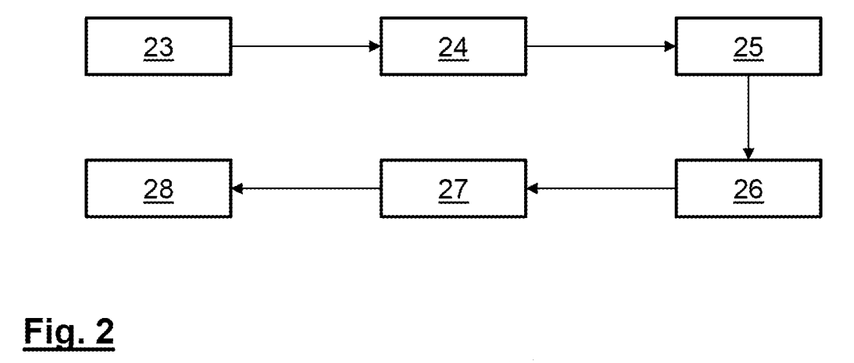
FIG. 2 shows a flowchart of an example method for draining the water supply system shown in FIG. 1.

A method for draining the water supply system 1 will now be described with regard to the flowchart shown in FIG. 2.

In a first step 23, the central water tank 2 will be drained by opening the drain valve 10. Opening the drain valve 10 is affected by the control 22. Since the central water tank 2 and the rigid plumbing 9 connecting the central water tank 2 to the drain valve are installed above and with a slope towards the drain valve 10, the central water tank 2 can be drained solely using gravity.

Once the central water tank 2 has been drained, in a second step 24 the control 22 closes all supply valves 16, 17 and commences in a third step 25 to drain the buffers 18, 19. Water is removed from the buffers 18, 19 by opening the consumers valves 20, 21 at the consumers 3a, 3b, 3d and 4a, 4b, 4d associated with the buffers 18, 19 while keeping the supply valves 16, 17 closed. The buffers 18, 19 are then emptied in a conventional fashion as if the water would during operation of the respective consumers. The water is drained through the aircraft's regular sewage water or waste water system which is not shown in FIG. 1. Drainage via the existing consumer equipment offers the advantage that extra drainage valves and physical separation elements between the fresh water and the waste system can be dispensed with.

Once the buffers 18, 19 have been drained, the supply valves 16, 17 are kept closed and in a fourth step 26 the supply lines 14, 15 of the conduit systems 11, 12 are pressurized at the supply pumps 7, 8 to a draining pressure. In the example embodiment, the supply lines 14 of the conduit system 11 forming the upper branch 5 in FIG. 1 are subjected to a positive pressure by pumping air into the supply lines 14 using the supply pump 7. Hence, the supply pump 7 is essentially running dry and supplies pressurized air to the conduit system 11. The air may, for example, be pressurized using the supply pump up to a pressure of 2.5 bar (250 kPa). Alternatively, the positive pressure may be provided by an external pressure source not shown in FIG. 1. The external pressure source may be attached to the conduit system 11 at or directly adjacent to the supply pump 7. Operation of the supply pump 7 or the external pressure source is controlled by the control 22.

In the same step 26, the supply lines 15 of the conduit system 12 forming the lower branch 6 of the supply system 1 shown in FIG. 1 are subjected to a negative pressure created by reversing the operation of the respective supply pump 8. Thus, the supply pump 8 creates suction for removing water from the supply lines 15 towards the low-pressure plumping 9. In an alternative embodiment, the supply lines 15 of the conduit system 12 are connected to an external vacuum source for creating the negative pressure. Operation of the supply pump 8 or the external vacuum source is controlled by the control 22. It should be noted that draining one subsystem with positive pressure and the other with negative pressure at the same time could result in an undesirable cycle effect. Thus, it would also be possible to complete draining one conduit system 11 with positive pressure first and draining the second conduit system 12 with negative pressure afterwards.

In the subsequent fifth step 27, the supply valves 16, 17 are sequentially opened by the control 22 according to a predetermined sequence while the supply lines 14, 15 are kept pressurized. The sequences are determined independently for each conduit system 11, 12 based on the length of the supply lines 14, 15 between the respective supply pump 7, 8 and the supply valves 16, 17, i.e., the supply length, and in each conduit system 11, 12 only one supply valve 16, 17 is opened at a time.

Figure 4:
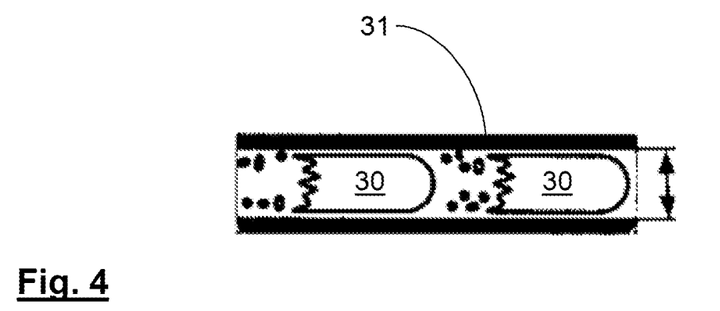
FIG. 4 shows an example of a plug/slug flow.

In the conduit system 11 forming the upper branch 5 which is subjected to a positive pressure, the sequence in which the supply valves 16 is determined by ordering the supply valves 16 according to their respective supply length in ascending order. In other words, the supply valve 16a which is arranged closest in terms of the length of the supply line 14a connecting the supply valve 16a to the supply pump 7 is opened first, next, the supply valve 16b is opened and finally the supply valve 16c is opened. While the respective supply valves 16 are open, water in the respective supply lines 14 is pushed out by the air supplied by the supply pump 7 into the buffers 18a, 18b or directly towards the consumer 3c. Due to the small internal diameter of the supply lines 14, air plugs or slugs are formed which effectively push the water out of the supply lines 14. A plug/slug flow is illustrated in FIG. 4 which shows a section of a flexible conduit 31 with an internal diameter of 4 mm. In the flexible conduit 31 air plugs or air slugs 30 are shown which take up nearly the entire internal diameter of the conduit 31.

For example, while the supply valve 16a is open, water is pushed out of the supply line 14a. Once all water has been removed from the supply line 14a, supply valve 16a is closed and supply valve 16b is opened, and water is removed from the supply line 14b. Since all water has been removed from the supply line 14a and a positive pressure is supplied by the supply pump 7, no water can be pushed into the supply line 14a once it has been drained. Finally, after all water has been drained from the supply line 14b, the supply valve 16b is closed and the supply valve 16c is opened for removing the remaining water in the supply line 14c. When draining of this supply line 14c has been completed all supply valves 16c are closed and the supply pump 7 is turned off by the control 22.

The sequence for opening the supply valves 17 of the lower branch 6 is obtained by ordering the supply valves 17 according to their supply length in descending order. Hence, the supply valve 17c which is arranged furthest away from the supply pump 8 is opened first, the supply valve 17b is opened second and the supply valve 17a is opened last. Each supply valve 17 is opened sufficiently long to ensure that at least the respective supply line 15 directly connecting only the supply valve to the supply pump 8 is completely drained. The water is drained through the supply pump 8 into the low-pressure plumbing 9 and out of the aircraft through the drain valve 10. Again, the sequence of opening the supply valves 17 ensures that no water is pushed into supply lines already drained.

The time for which the supply valves 16, 17 are opened can also be predetermined, for example, based on the length of the respective supply lines 14, so that it is ensured that a supply line 14, 15 is completely drained before the respective supply valve 16, 17 is closed. Alternatively or additionally, moisture sensors (not shown) can be used to measure residual moisture in the supply lines 14, 15 in which case a supply valve 16, 17 is only closed when the residual moisture in a supply line 14, 15 drops below a predetermined value. Alternatively or additionally, water flow sensors (not shown) can be used to determine water flow through the supply lines and a supply valve 16, 17 is only closed when the measured water flow falls below a predetermined value.

Finally, once all supply lines 14, 15 have been drained and the supply pumps 7, 8 have been switched off, in a last step 28 in case of a positive draining pressure water pushed from the supply lines is drained from the buffers 18, 19 by opening the respective consumer valves 20, 21 and allowing the water to flow through the aircraft's wastewater system (not shown). In case the supply lines 17 are subjected to a negative draining pressure, the water removed the supply lines 17 is drained in the last step 28 through the drain valve 10 before the latter is closed.

Figure 3:
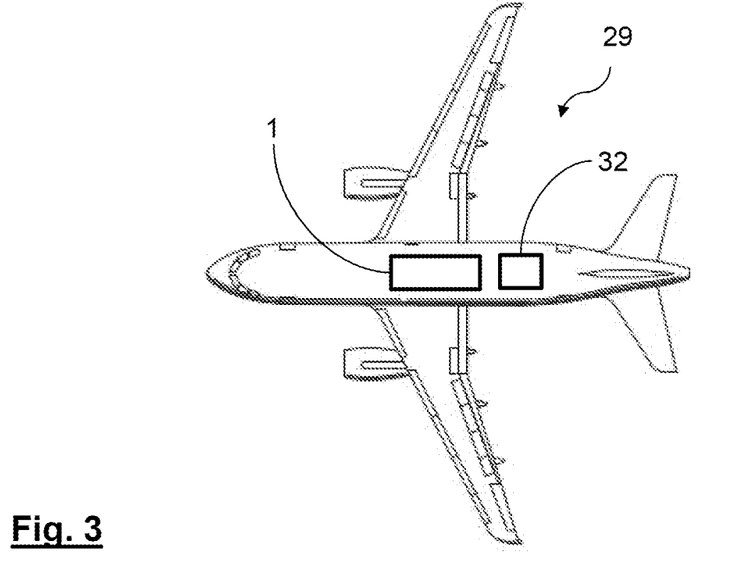
FIG. 3 shows a schematic drawing of an aircraft comprising a water supply system.

FIG. 3 shows an example embodiment of an aircraft 29 comprising a water supply system 1 as shown in FIG. 1 which can be drained according to the method described with reference to FIG. 2. The aircraft 29 further comprises at least one local water distribution system 32 according to one of the example embodiments described below.

With regard to FIGS. 5 to 7 three example embodiments of local water distribution systems 32 will now be described in more detail. Each local water distribution system comprises a buffer 33 which distributes water from an aircraft water supply system (not shown in FIGS. 5 to 7) to two consumers 34, 35. The consumer 34 is a faucet or tap 36 of a sink 37 and the consumer 35 is a rinsing device 38 of an aircraft toilet 39. Both consumers 34, 35 are located in the same aircraft lavatory (not shown).

The consumers 34, 35 are connected via supply lines 40, 41 to the buffers 33. In the example embodiments shown in FIGS. 5 and 7, each consumer 34, 35 is connected via a dedicated supply line 40, 41 to the buffer 33, i.e., every supply line 40, 41 supplies water to one consumer 34, 35 only. In the example embodiment of FIG. 6, the supply line 41 branches of from supply line 40, i.e., part of supply line 40 is used to supply water to both consumers 34, 35.

Each consumer 34, 35 is further associated with a consumer valve 42 which can be opened for supplying water to the respective consumer 34, 35. Also, each consumer 34, 35 comprises a drain valve 43 through which water can flow from the consumer 34, 35 to an aircraft wastewater system (not shown). In case of a toilet 39, the drain valve connects the toilet to a vacuum toilet system with a waste holding tank (not shown), whereas the wastewater from the sink 37 is drained overboard by the drain masts. Optionally, the wastewater from the sink 37 may also be collected in the waste holding tank.

The buffers 33 shown in the example embodiments each comprise a supply line 44 with a supply valve 45 through which water is supplied from a central water supply system 1. Further, in each buffer 33 a micropump 50 is shown in FIGS. 5 to 7. However, as will be discussed below the micropump 50 may be optional in some cases or could be replaced by a different pressurizer such as, for example, a permanently pressurized buffer. Furthermore, each buffer 33 comprises a vent 46 through which air can be supplied to the buffer 33. If necessary, the vent 46 may be a venting valve that can be operated by the control 49. In other embodiments in which the vent 46 is a mere venting line or venting opening which provides constant ventilation to the buffer 33.

Figure 5:
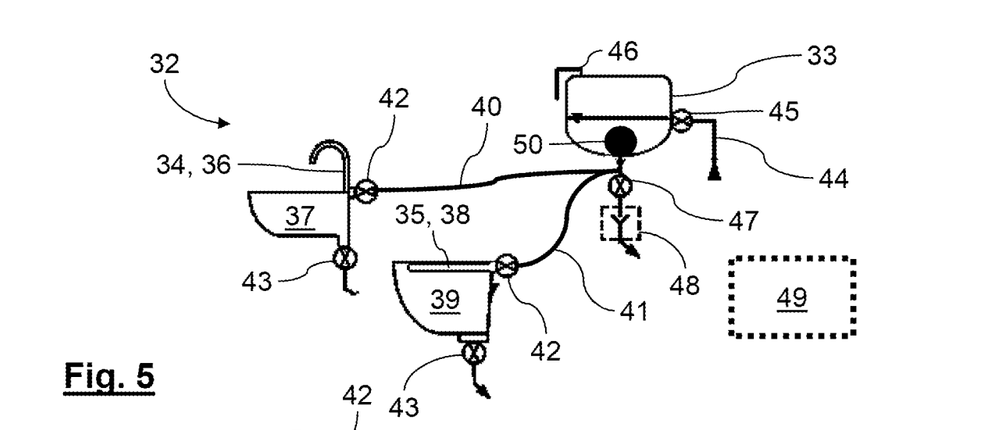
FIG. 5 shows a first example embodiment of a local water distribution system.
Figure 6:
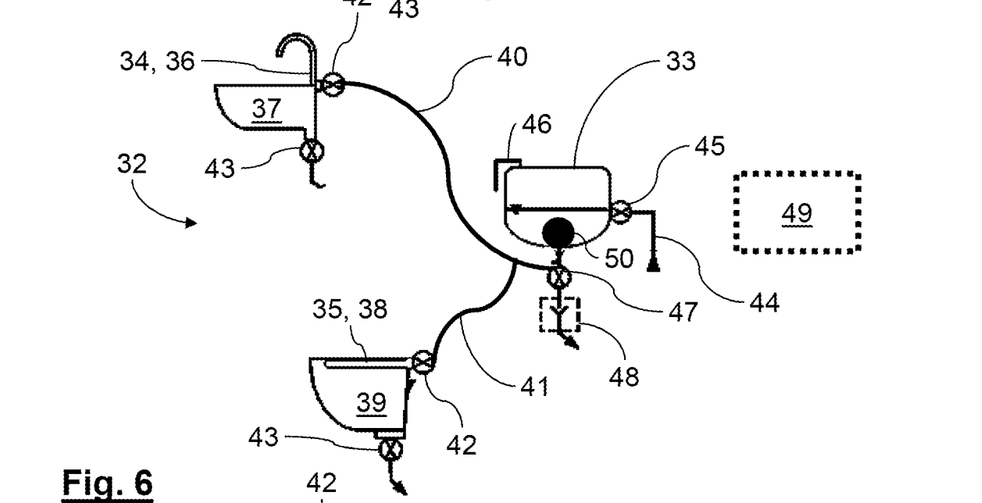
FIG. 6 shows a second example embodiment of a local water distribution system.
Figure 7:
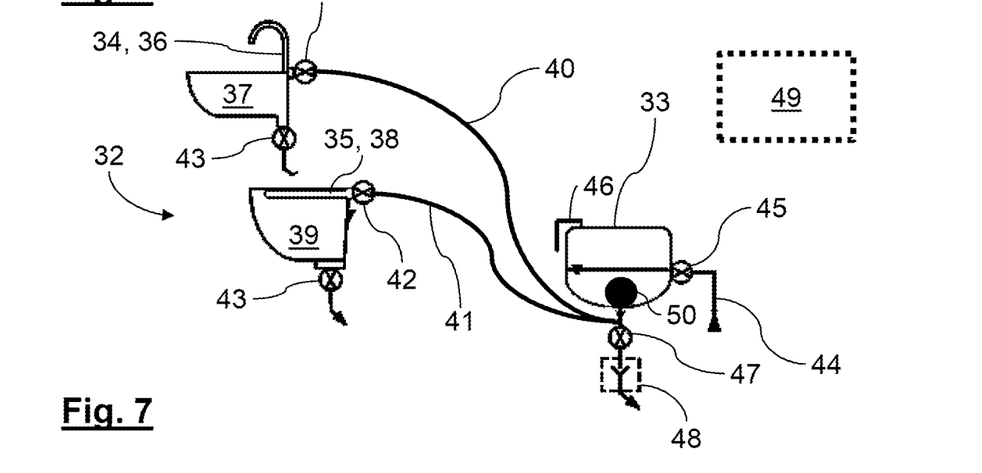
FIG. 7 shows a third example embodiment of a local water distribution system.

In FIGS. 5 to 7 each of the buffers 33 is shown with a drain valve 47 for draining the buffer 33 towards the aircraft wastewater system (now shown) via a separation element 48. The separation element 48 separates the freshwater in the local water distribution system 32 from the wastewater system and prevents contamination of the former. It should be noted that the drain valve 47 and, thus, also the separation element 48 are optional and may be dispensed with depending on the way the drainage of the local water distribution system 32 is implemented.

Finally, the local water distribution systems 32 each comprises a control 49 which controls the opening and closing of all valves 42, 43, 45, 46, 47 and also the operation of the micropump 50.

In the following, different ways of draining the buffers 33 and supply lines 41 of the local water distribution systems 32 will be described in more detail.

The example embodiment of a local water distribution system 32 shown in FIG. 5 is according to a first example embodiment drained solely using gravity. Here, the buffer 33 is arranged vertically above the consumers 34, 35 and the supply lines 40, 41 are arranged such that they run with a continuous slope towards the consumers 34, 35.

In this example, the buffer 33 does not require the micropump 50. In order to drain the buffer 33 and the supply lines 40, 41 by gravity, the supply valve 45 is closed by the control 49 and kept shut so that no more water can flow from the aircraft water supply system 1 into the local water distribution system 32. Next, the control 49 instructs the consumer valve 42 to open, such that water from the supply line 40 and the buffer 33 can flow out of the tap 36 and through the sink 37 and the sink drain valve 43 into the aircraft's waste water system.

Note that the faucet 36 is shown schematically in FIG. 5 and is understood to be formed such that no point of the supply line 40 leading to the faucet 36 is below the outlet of the faucet 36. Further, to ensure that the buffer 33 can be drained, the vent/valve 46 has to be open. The vent/valve 43 may be permanently open or can also be a valve that can be controlled by the control 49.

The control 49 also controls the drain valve 43 to open and keeps both the consumer valve 42 of the faucet 36 and the drain valve 43 open for a sufficiently long time that the buffer 33 and the supply line 40 connecting this consumer valve 42 to the buffer 33 drain completely. Note that is some embodiments the drain valve 43 of the sink 37 may be a passive valve which cannot be operated by the control 49. The time can, for example, be chosen based on the flow rate of water out of the faucet 36 and under the assumption that the buffer 33 is completely full or based on the actual fill level of the buffer 33 provided that the latter is available to the control 49. Alternatively or additionally, sensors (not shown) can be placed in the supply lines to determine when the supply lines 40, 41 haven been sufficiently drained. The sensors could, for example, be flow rate sensors or sensors measuring residual moisture.

Once the buffer 33 and the supply line 40 have been drained, the consumer valve 42 associated with the faucet 36 is closed and the consumer valve 42 associated with the flushing device 38 is opened. Again, the consumer valve 42 is kept open for a sufficiently long time to ensure that the entire supply line 41 has been drained. Since the buffer 33 as advantageously already been drained completely through the first supply line 40, it can be ensured that no water can flow from the buffer 33 into the already drained supply line 40 while the other supply line 41 is drained. Once the second supply line 41 connecting the flushing device 38 to the buffer 33 has been drained, the corresponding consumer valve 42 is closed. Since the drain valve 43 attached to the toilet 39 is connected to the vacuum system, it can be briefly opened when needed to remove the water drained into the toilet. For example, the drain valve 43 could be opened once the supply line 41 have been completely drained. However, in case larger amounts of water are drained into the toilet 39 from the local water distribution system 32, it may also be necessary to open the drain valve 43 intermittently.

Note that in case the buffer 33 comprises a micropump 50, which is not necessary in the embodiment shown in FIG. 5, it has to be ensured that the micropump 50 does not hinder the water flow when gravity based drainage is used.

In an alternative second example embodiment in which the buffer 33 comprise a drain valve 47, before opening any of the consumer valves 42 for draining the supply lines, the contents of the buffer 33 are drained through the drain valve 47 directly into the wastewater system of the aircraft. Hence, before instructing any of the consumer valves 42 to open, the control 49 first opens the buffer drain valve 47 and keeps it open for a sufficiently long time until the buffer 33 has been drained completely. Again, the time which the buffer drain valve 47 is kept open may depend, for example, on an estimated time which is calculated from the flow rate through the buffer drain valve 47 under the assumption that the buffer 33 is completely filled or based on the actual fill level of the buffer 33. Also, it is conceivable that the buffer drain valve is closed when a fill sensor (not shown) in the buffer 33 reports that the buffer 33 is empty. Once the buffer 33 has been drained completely, drainage of the supply lines 40, 41 can be performed as described in the first example embodiment.

In a third example embodiment, the buffer 33 of the local water distribution network 32 shown in FIG. 5 comprises a micropump 50. The micropump 50 can be used to assists the gravity-based draining described in the first and second example embodiment by actively removing water from the buffer. Further, provided that the micropump 50 has dry running capabilities, the micropump 50 can further be used to subject the supply lines 40, 41 with a positive pressure by pumping air into the supply lines. Subjecting the supply lines 40, 41 with positive pressure facilitates draining of the supply lines in particular when the supply lines 40, 41 do not have a continuous slope or are so narrow that capillary effects or surface tension of the water prevent successful drainage solely by gravity. For example, when a flexible supply line sags, parts of the supply line 40, 41 could be arranged below the outlet of the consumers 34, 35 so that residual water would remain in the supply lines 40, 41. The micropump 50 would also be controlled by the control 49 and could, for example, pressurize the supply lines 40, 41 for as long as one of the consumer valves 42 is open.

A positive pressure could alternatively be provided by the aircraft water supply system 1 through the supply valve 45. However, providing positive pressure through the supply valve 45 would require that the venting valve 46 is closed while the buffer 33 and the supply lines 40, 41 are pressurized by the aircraft water supply system 1 to avoid a loss of pressure.

In an alternative fourth example embodiment, operation of the micropump 50 in FIG. 5 could be reversed so that the supply lines 40, 41 are subjected to a negative pressure. Again, this requires that the micropump 50 has dry running capabilities. The negative pressure or the suction created by the micropump 50 can be used to remove the water from the supply lines 40, 41 and such it back into the buffer 33. From the buffer 33 the water could then be drained through the buffer drain valve 47.

Alternative, the negative pressure could be provided by the aircraft water supply system 1 through the supply valve 45. In this case the water from the buffer 33 could be drained back into the aircraft water supply system 1 from the buffer 33. However, providing negative pressure through the supply valve 45 would require that the venting valve 46 is closed while the buffer 33 and the supply lines 40, 41 are negatively pressurized by the aircraft water supply system 1 to avoid a loss of pressure. Also, the consumer valves 42 should be opened sequentially to avoid a loss of pressure. When the negative pressure is provided by the aircraft water supply system 1, the water from the buffer 33 as well as the water from the supply lines 40, 41 drained into the buffer 33 can either be drained through a buffer drain valve 47, if available, or can be drained out of the buffer through the supply valve 45 and the supply line 44.

In the example embodiment of a local water distribution system 32 shown in FIG. 5, the faucet 36 is arranged vertically above the buffer 33 whereas the rinsing device 38 is arranged vertically below the buffer 33. Here, both the third and the fourth example embodiment of a method for draining the local water distribution system 32 could be used, i.e., the supply lines 40, 41 as well as the buffer 33 could be drained using a negative or a positive draining pressure.

Alternatively, gravity-based draining as described in the first and secondary example embodiment could also be employed. However, it would be essential to drain the supply line 40 connecting the faucet 36 to the buffer 33 before or while the supply line 41 is drained.

For example, all consumer valves 42 could be opened at the same time so that the water from the supply line 40 and the buffer 33 is drained through the consumer valve 42 associated with the flushing device 38. Alternatively, the supply line 40 could be drained into the buffer 33. In this case, drainage of the supply line 40 by gravity could be supported using a micropump 50 subjecting the supply line to a negative pressure. Further, if a buffer drain valve 47 is available, the supply line 4o could be drained by opening both the consumer valve 42 and the buffer drain valve 47 at the same time which would also facilitate drainage of the buffer 33. Further, in the embodiment of FIG. 5 water from the buffer 33 and the supply line 41 connecting the buffer 33 to the rinsing device 38 could be drained entirely by gravity when the supply valve 42 of the rinsing device 38 is opened. Venting of the buffer 33 should in this case be provided using the venting valve 46 of the buffer. The supply line 41 could be vented alternatively or additionally by opening the consumer valve 42 associated with the faucet 36 since the supply lines 40, 41 are directly connected.

Finally, in the example embodiment of a local water distribution system 32 shown in FIG. 7 both, i.e., all, consumers 34, 35 are arranged vertically above the buffer 33. Both positive and negative draining pressure-based drainage could be used as described in the third and fourth example embodiments.

In case gravity-based drainage should be used, both supply lines would need to be drained either into the buffer 33 or, if available, directly using the buffer drain valve 47 into the wastewater system. Here, it appears to be particularly advantageous to first drain the upper supply line 40 by first opening the associated consumer valve 42 before the lower supply line 41 is drained by sequentially opening the associated consumer valve 42. Otherwise, water from the upper supply lines 40 could flow back into a previously drained supply line 41. Here, the gravity-based drainage could be supported using a negative pressure either provided by the aircraft water supply system 1 or the micropump 50.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for draining a local water distribution system comprising:
a plurality of consumers;
a buffer that locally stores water from an aircraft water supply system to be distributed to each of the plurality of consumers;
supply lines connecting each of the plurality of consumers to the buffer; and
consumer valves, each of which is associated with one or more of the plurality of consumers;
wherein the water from the buffer can be dispensed through a respective consumer of the plurality of consumers by opening the consumer valve associated with the respective consumer;
the method comprising:
opening the consumer valves to drain the water from the supply lines;
wherein the water is drained from the buffer through:
one of the supply lines and the consumer valves; or
a drain valve connecting the buffer to a wastewater system of an aircraft;
wherein opening the consumer valves comprises opening the consumer valves sequentially, so that the water is only drained from the supply lines connecting the consumer associated with an open one of the consumer valves to the buffer; and
wherein opening the consumer valves sequentially comprises opening the consumer valves in a predetermined sequence based on:
a length of the supply lines connecting the consumer associated with the consumer valves to the buffer; and/or
a relative vertical arrangement of the consumer valves.

2. The method according to claim 1, wherein:
only one of the consumer valves is opened at a time; and/or
each of the consumer valves is opened for a predetermined time.

3. The method according to claim 1, wherein:
the water is drained from the buffer and/or the supply lines by gravity;
one of the consumer valves associated with a respective consumer of the plurality of consumers, which has an outlet arranged vertically below the buffer, is opened for draining water from the supply lines connecting the respective consumer to the buffer through the outlet arranged vertically below the buffer; and/or
one of the consumer valves associated with a respective consumer of the plurality of consumers, which has an outlet arranged vertically above the buffer, is opened for draining water into the buffer from the supply lines connecting the respective consumer to the buffer; and/or
one of the consumer valves associated with a respective consumer of the plurality of consumers, which has an outlet arranged vertically below the buffer, is opened for draining water from the buffer through the outlet arranged vertically below the buffer.

4. The method according to claim 1, comprising subjecting the supply lines to a drainage pressure for draining water from the supply lines;
wherein the drainage pressure is provided by one of:
a pump arranged in the buffer for supplying the water from the buffer to the plurality of consumers;
a pressurizer that maintains the water in the buffer during regular operation of the buffer at a predetermined consumer pressure; or
the aircraft water supply system, from which the buffer receives the water to be supplied to the plurality of consumers.

5. The method according to claim 4, wherein the drainage pressure is a positive drainage pressure and is created:
in the supply lines such that, when the consumer valve associated with a corresponding consumer of the plurality of consumers is open, the water is pushed out of the supply lines through the corresponding consumer; and/or
in the buffer such that, when the consumer valve associated with a further corresponding consumer of the plurality of consumers is open, the water is pushed out of the buffer through the further corresponding consumer.

6. The method according to claim 4, wherein the drainage pressure is a negative drainage pressure and is created:
in the supply lines such that, when the consumer valve associated with a corresponding consumer of the plurality of consumers is open, the water from the supply lines connecting the corresponding consumer is drained into the buffer or the aircraft water supply system; and/or
in the buffer such that, when the consumer valve associated with a further corresponding consumer of the plurality of consumers is open or when a vent of the buffer is open, the water is drained into the aircraft water supply system.

7. The method according to claim 4, wherein the drainage pressure is a positive drainage pressure and is created:
in the supply lines such that, when the consumer valve associated with a corresponding consumer of the plurality of consumers is open, the water is pushed out of the supply lines through the corresponding consumer; and
in the buffer such that, when the consumer valve associated with a further corresponding consumer of the plurality of consumers is open, the water is pushed out of the buffer through the corresponding consumer.

8. The method according to claim 1, wherein:
the water is drained from the buffer and/or the supply lines by gravity;
one of the consumer valves associated with a respective first consumer of the plurality of consumers, which has an outlet arranged vertically below the buffer, is opened for draining water from the supply lines connecting the respective first consumer to the buffer through the outlet arranged vertically below the buffer; and
one of the consumer valves associated with a respective second consumer of the plurality of consumers, which has an outlet arranged vertically above the buffer, is opened for draining water into the buffer from the supply lines connecting the respective second consumer to the buffer; and
one of the consumer valves associated with a respective third consumer of the plurality of consumers, which has an outlet arranged vertically below the buffer, is opened for draining water from the buffer through the outlet arranged vertically below the buffer.

9. The method according to claim 1, wherein opening the consumer valves sequentially comprises opening the consumer valves in a predetermined sequence based on:
the length of the supply lines connecting the consumer associated with the consumer valves to the buffer; and
the relative vertical arrangement of the consumer valves.

10. A local water distribution system comprising:
a plurality of consumers;
a buffer that is configured to locally store water from an aircraft water supply system to be distributed to each of the plurality of consumers;
supply lines connecting each of the plurality of consumers to the buffer;
consumer valves, each of which is associated with one or more of the plurality of consumers; and
a control;
wherein the buffer is configured to dispense the water contained therein through a respective consumer of the plurality of consumers by opening the consumer valve associated with the respective consumer;
wherein the control is configured for opening the consumer valves for draining the water from the supply lines; and
wherein the control is configured for:
opening one or more of the consumer valves for draining water from the buffer through one of:
the supply lines; and
the one or more of the consumer valves that is open; or
opening a drain valve for draining the water in the buffer to a wastewater system of an aircraft;
wherein opening the consumer valves comprises opening the consumer valves sequentially, so that the water is only drained from the supply lines connecting the consumer associated with an open one of the consumer valves to the buffer; and
wherein opening the consumer valves sequentially comprises opening the consumer valves in a predetermined sequence based on:
a length of the supply lines connecting the consumer associated with the consumer valves to the buffer; and/or
a relative vertical arrangement of the consumer valves.

11. The water distribution system according to claim 10, wherein:
the control is configured for opening only one of the consumer valves at a time; and/or
the control is configured for opening each of the consumer valves for a predetermined time.

12. The water distribution system according to claim 10, wherein:
the system is configured for draining from the buffer and/or the supply lines by gravity;
the control is configured for opening one of the consumer valves associated with a respective consumer of the plurality of consumers, which has an outlet arranged vertically below the buffer, for draining water from the supply lines connecting the respective consumer to the buffer through the outlet arranged vertically below the buffer; and/or
the control is configured for opening one of the consumer valves associated with a respective consumer of the plurality of consumers, which has an outlet arranged vertically above the buffer, for draining water into the buffer from the supply lines connecting the respective consumer to the buffer; and/or
the control is configured for opening one of the consumer valves associated with a respective consumer of the plurality of consumers, which has an outlet arranged vertically below the buffer, for draining water from the buffer through the outlet arranged vertically below the buffer.

13. The water distribution system according to claim 10, wherein:
for draining water from the supply lines, the system is further configured for subjecting the supply lines to a drainage pressure for draining the water from the supply lines; and
the system is configured for providing the draining pressure by one of:
a pump arranged in the buffer for supplying the water from the buffer to the plurality of consumers;
a pressurizer configured to maintain the water in the buffer during regular operation of the buffer at a predetermined consumer pressure; or
the aircraft water supply system, from which the buffer receives the water to be supplied to the plurality of consumers.

14. The water distribution system according to claim 13, wherein the drainage pressure is a positive drainage pressure and is created:
in the supply lines such that, when the consumer valve associated with a corresponding consumer of the plurality of consumers is open, the water is pushed out of the supply lines through the corresponding consumer; and/or
in the buffer such that, when the consumer valve associated with a further corresponding consumer of the plurality of consumers is open, the water is pushed out of the buffer through the further corresponding consumer.

15. The water distribution system according to claim 13, wherein the drainage pressure is a negative drainage pressure and is created:
in the supply lines such that, when the consumer valve associated with a corresponding consumer of the plurality of consumers is open, the water from the supply lines connecting the corresponding consumer is drained into the buffer or the aircraft water supply system; and/or in the buffer such that, when the consumer valve associated with a further corresponding consumer of the plurality of consumers is open or when a vent of the buffer is open, the water is drained into the aircraft water supply system.

16. The water distribution system according to claim 13, wherein the drainage pressure is a positive drainage pressure and is created:
- in the supply lines such that, when the consumer valve associated with a corresponding consumer of the plurality of consumers is open, the water is pushed out of the supply lines through the corresponding consumer; and
- in the buffer such that, when the consumer valve associated with a further corresponding consumer of the plurality of consumers is open, the water is pushed out of the buffer through the further corresponding consumer.

17. The water distribution system according to claim 13, wherein the drainage pressure is a negative drainage pressure and is created:
- in the supply lines such that, when the consumer valve associated with a corresponding consumer of the plurality of consumers is open, the water from the supply lines connecting the corresponding consumer is drained into the buffer or the aircraft water supply system; and
- in the buffer such that, when the consumer valve associated with a further corresponding consumer of the plurality of consumers is open or when a vent of the buffer is open, the water is drained into the aircraft water supply system.

18. An aircraft comprising the local water distribution system according to claim 10.

* * * * *